(12) United States Patent
Meller

(10) Patent No.: US 7,923,854 B1
(45) Date of Patent: Apr. 12, 2011

(54) WIND TURBINES DIRECT DRIVE ALTERNATOR SYSTEM WITH TORQUE BALANCING

(76) Inventor: Moshe Meller, Tel Aviv (IL)

( * ) Notice: Subject to any disclaimer, the term of this patent is extended or adjusted under 35 U.S.C. 154(b) by 0 days.

(21) Appl. No.: 12/779,475

(22) Filed: May 13, 2010

(51) Int. Cl.
F03D 9/00 (2006.01)
H02P 9/04 (2006.01)

(52) U.S. Cl. ............................................. 290/55; 290/44
(58) Field of Classification Search .................... 290/55
See application file for complete search history.

(56) References Cited

U.S. PATENT DOCUMENTS

| | | | | |
|---|---|---|---|---|
| 2,153,523 A | * | 4/1939 | Edmonds et al. | 290/55 |
| 2,388,377 A | * | 11/1945 | Albers | 290/55 |
| 4,039,848 A | * | 8/1977 | Winderl | 290/55 |
| 4,073,516 A | | 2/1978 | Kling | |
| 4,084,102 A | | 4/1978 | Fry et al. | |
| 4,165,468 A | | 8/1979 | Fry et al. | |
| 4,166,569 A | | 9/1979 | Begnaud et al. | |
| 4,166,596 A | | 9/1979 | Mouton et al. | |
| 4,213,057 A | * | 7/1980 | Are | 290/44 |
| 4,219,303 A | | 8/1980 | Mouton, Jr. et al. | |
| 4,285,481 A | * | 8/1981 | Biscomb | 244/33 |
| 4,309,006 A | | 1/1982 | Biscomb | |
| 4,345,161 A | * | 8/1982 | Crompton | 290/55 |
| 4,350,898 A | | 9/1982 | Benoit | |
| 4,350,899 A | | 9/1982 | Benoit | |
| 4,358,243 A | | 11/1982 | Heath | |
| 4,383,182 A | | 5/1983 | Bowley | |
| 4,450,364 A | | 5/1984 | Benoit | |
| 4,470,563 A | | 9/1984 | Engelsman | |
| 4,491,739 A | | 1/1985 | Watson | |
| 4,495,423 A | | 1/1985 | Rogers | |
| 4,547,124 A | | 10/1985 | Kliatzkin et al. | |
| 4,572,962 A | | 2/1986 | Shepard | |
| 4,997,414 A | * | 3/1991 | Camara et al. | 475/330 |

(Continued)

FOREIGN PATENT DOCUMENTS

JP 57-070964 A 5/1982

(Continued)

OTHER PUBLICATIONS

Notification of Transmittal of the International Search Report and the Written Opinion of the International Searching Authority, or the Declaration issued in PCT/US/2009/043807, mailed Jan. 14, 2010.

(Continued)

*Primary Examiner* — Joseph Waks
(74) *Attorney, Agent, or Firm* — Holtz, Holtz, Goodman & Chick, PC

(57) ABSTRACT

Wind turbine direct drive alternator system includes a supporting structure, at least two turbines mounted on the supporting structure to rotate in opposite directions when exposed to the same wind, a respective number of alternator rotor disks whereby each turbine is directly connected to an alternator rotor disk, and a stator unit having two sides each facing a respective rotor disk. The stator unit is arranged or constructed such that torque generated by rotation of each turbine can be transmitted therethrough with a view toward balancing the torque induced on the supporting structure by rotation of the turbines. When the stator unit includes two stator disks, each stator disk transmits approximately the same magnitude of torque as, but in an opposite direction to, the other stator disk. The two stator disks balance the torque of each other and almost no external torque is needed to balance the system.

22 Claims, 11 Drawing Sheets

U.S. PATENT DOCUMENTS

| | | | |
|---|---|---|---|
| 5,040,948 A | 8/1991 | Harburg | |
| 5,062,765 A | 11/1991 | McConachy | |
| 5,506,453 A | 4/1996 | McCombs | |
| 5,798,632 A | 8/1998 | Muljadi | |
| 6,091,161 A | 7/2000 | Dehlsen et al. | |
| 6,127,739 A | 10/2000 | Appa | |
| 6,278,197 B1 | 8/2001 | Appa | |
| 6,476,513 B1* | 11/2002 | Gueorguiev | 290/55 |
| 6,492,743 B1 | 12/2002 | Appa | |
| 6,781,254 B2 | 8/2004 | Roberts | |
| 6,945,747 B1 | 9/2005 | Miller | |
| 6,975,045 B2* | 12/2005 | Kurachi et al. | 290/44 |
| 7,129,596 B2 | 10/2006 | Macedo | |
| 7,183,663 B2 | 2/2007 | Roberts et al. | |
| 7,309,930 B2 | 12/2007 | Suryanarayanan et al. | |
| 7,317,261 B2 | 1/2008 | Rolt | |
| 7,335,000 B2 | 2/2008 | Ferguson | |
| 7,384,239 B2 | 6/2008 | Wacinski | |
| 7,489,046 B2 | 2/2009 | Costin | |
| 7,582,981 B1 | 9/2009 | Meller | |
| 7,679,249 B2* | 3/2010 | Appa et al. | 310/114 |
| 7,709,973 B2* | 5/2010 | Meller | 290/55 |
| 7,723,861 B2* | 5/2010 | Meller | 290/55 |
| 7,821,149 B2* | 10/2010 | Meller | 290/44 |
| 7,830,033 B2* | 11/2010 | Meller | 290/55 |
| 2004/0096327 A1* | 5/2004 | Appa et al. | 416/1 |
| 2006/0251505 A1 | 11/2006 | Ferguson | |
| 2007/0228738 A1 | 10/2007 | Wrage et al. | |
| 2008/0023964 A1 | 1/2008 | Sureshan | |
| 2008/0048453 A1 | 2/2008 | Amick | |
| 2008/0296905 A1 | 12/2008 | Ferguson | |
| 2009/0152391 A1 | 6/2009 | McWhirk | |
| 2010/0032947 A1 | 2/2010 | Bevirt | |
| 2010/0032948 A1 | 2/2010 | Bevirt | |
| 2010/0032949 A1 | 2/2010 | Varrichio et al. | |
| 2010/0066093 A1 | 3/2010 | Meller | |
| 2010/0066095 A1 | 3/2010 | Meller | |
| 2010/0111697 A1* | 5/2010 | Wood | 416/128 |

FOREIGN PATENT DOCUMENTS

| | | |
|---|---|---|
| JP | 2-161173 A | 6/1990 |
| WO | WO 2007/051034 A2 | 5/2007 |
| WO | WO 2007051034 A2 * | 5/2007 |

OTHER PUBLICATIONS

Related U.S. Appl. No. 12/284,046, filed Sep. 18, 2008; entitled: "Airborne Stabilized Wind Turbines System" Inventor: Moshe Meller.

Related U.S. Appl. No. 12/465,877, filed May 14, 2009; entitled: "Airborne Stabilized Wind Turbines System" Inventor: Moshe Meller.

Related U.S. Appl. No. 12/634,499, filed Dec. 10, 2009; entitled: "Airborne Stabilized Wind Turbines Systems" Inventor: Moshe Meller.

Related U.S. Appl. No. 12/772,736, filed May 3, 2010; entitled: "Airborne Wind Turbine Electricity Generating System" Inventor: Moshe Meller.

U.S. Appl. No. 12/980,589; filed Dec. 29, 2010; Title: "Axial Flux Alternator With Special Devices to Maintain an Accurate Air Gap"; Inventor: Moshe Meller.

* cited by examiner

Section P-P

Section A-A

US 7,923,854 B1

WIND TURBINES DIRECT DRIVE ALTERNATOR SYSTEM WITH TORQUE BALANCING

FIELD OF THE INVENTION

The present invention relates generally to a wind energy generating system that can be airborne, fixed to a ground-based tower or situated offshore, and more specifically to a wind energy generating system that includes multiple turbines and a direct drive alternator system that are arranged to minimize and possibly eliminate induced torque on the system.

BACKGROUND OF THE INVENTION

In order to produce electricity from a wind turbine, the rotations of the wind turbine are typically transferred to an alternator, directly or through an intervening transmission system. Output power of the alternator is a result of the multiplication of the rotational speed of the wind turbine (in radians per second) by the torque (in Newton-meters) that is acting on a rotor of the alternator.

There is a trend to increase the span of wind turbines in order to capture more wind power; however, the rotational speed of the wind turbines has decreased. As a result, the torque induced by the wind turbine on the alternator rotor has increased accordingly. For example, for a 1 mega watt wind turbine rotating at 30 rpm (3.14 radians/second), the torque induced on the alternator rotor while producing 1 MW will be"

Torque=1,000,000 W/3.14 radians/second=318471 Newton-meter=32.5 metric tons. This enormous torque must be balanced by the construction of the wind turbine wherever it is placed, i.e., on the ground, offshore or in the air.

OBJECTS OF THE PRESENT INVENTION it is an object of at least one embodiment of the present invention to provide a wind energy generating system including a plurality of wind turbines and an alternator system that are torque balanced, i.e., the torque that the turbines and alternator induced on other sections of the system will be almost zero.

Another object of at least one embodiment of the present invention is to provide a wind energy generating system with a direct drive alternator, i.e., the does not have a transmissions.

Yet another object of at least one embodiment of the present invention is to provide a wind energy generating system that can be used with different types of wind turbines, whether mounted to the ground, mounted offshore over a body of water or airborne.

Still another object of at least one embodiment of the present invention is to provide a wind energy generating system that will be light-weight and have a relatively low cost to produce.

Accordingly, one embodiment of a wind energy generating system in accordance with the present invention comprises a supporting structure, at least two turbines rotatably mounted on the supporting structure and arranged to rotate in opposite directions when exposed to the same wind, a respective number of alternator rotor disks whereby each turbine is directly connected to one of the alternator rotor disks, and a stator unit including at least two stator disks that are mechanically connected to or integral with each other such that each stator disk transmits approximately the same magnitude of torque as, but in an opposite direction to, the other stator disk. As such, the two stator disks balance the torque of each other and almost no external torque is needed to balance the wind energy generating system, with respect to induced torque on the supporting structure.

Other and further objects, advantages and features of the present invention will be understood by reference to the following specification in conjunction with the annexed drawings.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
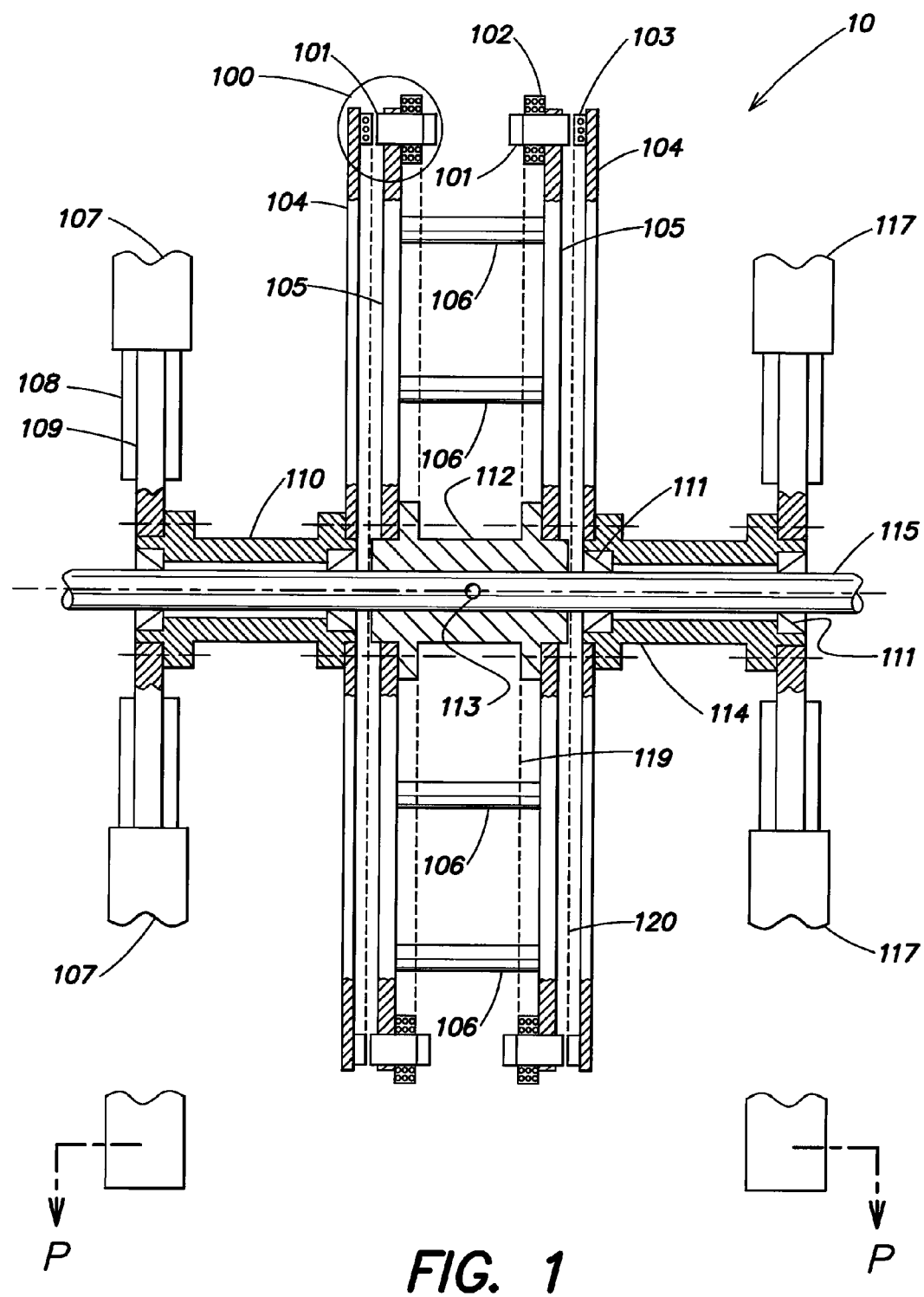
FIG. 1 is a side view, partially in cross section, shows turbines and an alternator section of a wind energy generating system in accordance with the invention.

Referring to the accompanying drawings wherein the same reference numerals designate the same or similar elements, a wind energy generating system in accordance with the invention is designated generally as 10 and comprises two turbines, each including two turbine blades 107 and 117, and which turbines are arranged to have opposite rotational directions when exposed to the same wind. Additional turbines and turbine blades may be provided.

Wind turbine blades 107 and 117 are connected to hubs 109 by connecting elements 108, and wind turbine blades 107 are connected through a hub 109 to a front bearing housing 110 while wind turbine blades 117 are connected through a hub 109 to a rear bearing housing 114. The bearing housings 110 and 114 allow the turbines with turbine blades 107 and 117, respectively, to rotate freely around a rotation axis defined by a main shaft 115 and transfer their rotational motion to rotor disks 104. Bearings 111 are placed inside the bearing housings 110 and 114 to enable rotation of the bearing housings 110 and 114 relative to the main shaft 115. Bearings 111 may be conical type bearings, or other type of bearings that can support axial and radial forces. The main shaft 115 has a hole 113 therein through which electrical wires (not shown) may pass, for example as shown by wires 175 and 176 in FIG. 16.

Figure 4:
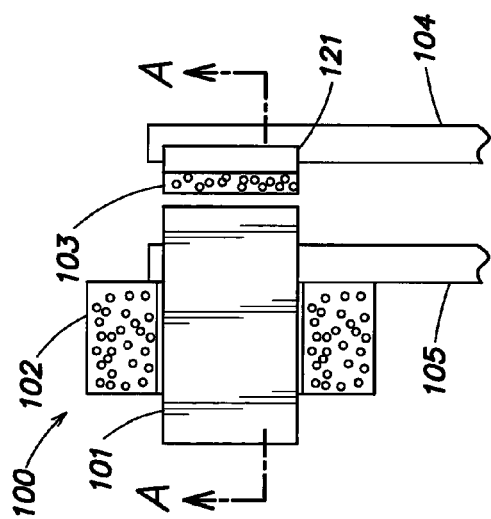
FIG. 4 is a cross-sectional view taken along line A-A of FIG. 3.

Wind energy generating system 10 also includes alternators components. The segment designated 100, enlarged in FIG. 4, shows a segment of a permanent, rotor magnet 103, a rotor disk 104, a stator magnetic core 101, a pre-winding coil 102 and a stator disk 105. The stator magnetic core 101, in this embodiment of the system, has a generally C-shape and it can be produced by any of the following technologies: laminations, c-cores, unicore and other technologies that are known in the industry. The pre-winding coil 102 can be assembled on the magnetic core 101, and this method will make the stator winding process more economical, but other methods of coil winding can be used. The combination of the stator magnetic core 101 and the pre-winding coil 102 constitute a conductive coil assembly. Each rotor disk 104 is arranged relative to the facing one of the stator disks 105 such that the magnets 103 on the rotor disks 104 generate a magnetic field that encompasses the conductive coil assemblies on the stator disk 105.

Figure 5:
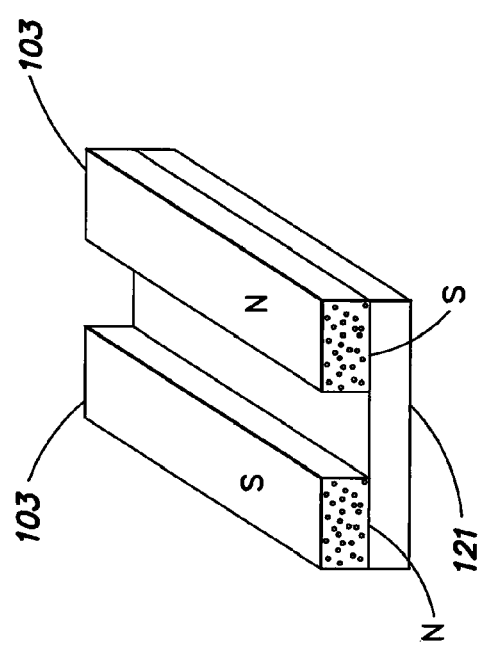
FIG. 5 is an arrangement of one segment of the permanent magnet of the wind energy generating system in accordance with the invention.

Rotor magnet 103 is one of the system's permanent magnets which will be shown in detail in FIG. 5. The wind generating system 10 includes at least two rotor disks 104, shown in detail in FIG. 6, each rotor disk 104 is arranged to be rotated upon rotation of a respective wind turbine with turbine blades 107 or 117. Wind generating system 10 also includes at least two stator disks 105, shown in detail in FIG. 7, each of which is at least partly opposed to a disk-shaped portion of a respective rotor disk 104.

Connecting elements 106 are arranged between the at least two stator disks 105 and transfer the opposite directional torques between the stator disks 105 and enable the torque-balancing in accordance with the invention. The number of connecting elements 106 can vary and in the illustrated embodiment of the invention, there are eight connecting elements 106. The shape of the connecting elements 106 can vary and in the illustrated embodiment, they have a substantially cylindrical shape. Thus, different numbers and shapes of connecting elements are envisioned in the invention.

A supporting cylinder 112 connects the stator disks 105 to the main shaft 115. Supporting cylinder 112 allows a center positioning of the stator disks 105 and the rotor disks 104 relative to each other, as well as connection of the wind generating system 10 to a ground-based or offshore tower, shown in detail in FIGS. 9-11.

Magnetic cores and/or coils 119 are placed around the stator disks 105, represented by dotted lines. Also, permanent magnetic elements 120 are placed around the rotor disks 104, also represented by dotted lines.

Figure 2:
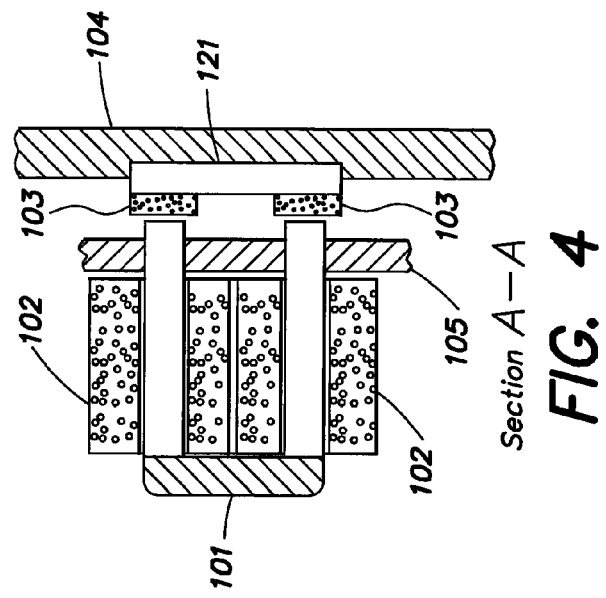
FIG. 2 is a view along line p-p of FIG. 1 through the turbines blades and shows the profile and angle of the blades.

FIG. 2 shows a cross-sectional profile and angular position of the turbine blades 107 and 117 along line p-p in FIG. 1. The profile of the turbine blades 107 and 117 is preferably identical. However, the angle of attack of the turbine blades 107 and 117 relative to a direction of the wind 135 is different from one another and arranged to produce opposite rotational movement in that the turbine with turbine blades 107 rotates in the direction of arrow 116 while turbine with turbine blades 117 rotates in the direction of arrow 118 while exposed to wind in the same direction 135.

Figure 3:
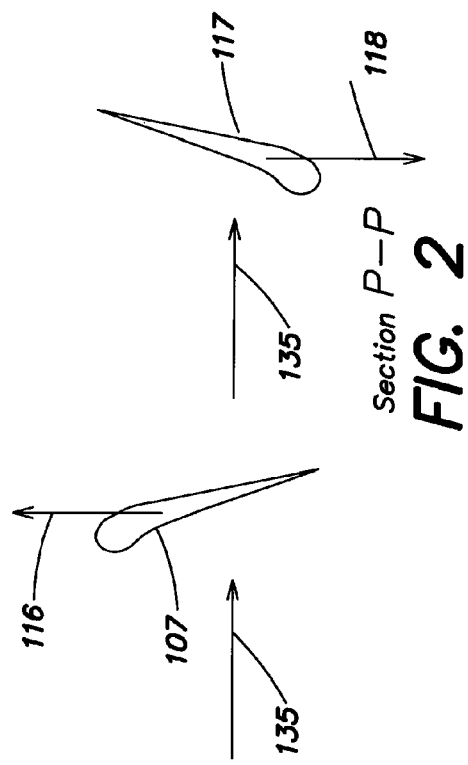
FIG. 3 is a detailed drawing of segment 100 of the wind energy generating system shown in FIG. 1.

FIG. 3 shows segment 100 of FIG. 1 including one magnetic core 101, two pre-winding coils 102, two permanent magnets 103, a plate 121, part of the stator disk 105, and part of the rotor disk 104. Plate 121 may comprise iron. The magnetic core 101 is preferably made from laminations of silicon steel, that provide the magnetic core 101 with a generally U-shape with the pre-winding coils 102 being placed around the two arms of the U-shaped magnetic core (see FIG. 4). The number of windings and the cross-sectional area of the winding wire can be adjusted according to the electrical requirements of the alternator. The U-shaped magnetic core 101 and the pre-winding of coils thereabout allow a more accurate and more economical production process of the coils. Other winding techniques and magnetic core shapes can be used in the invention.

FIG. 4 shows segment 100 in a cross-sectional view along line A-A in FIG. 3. Permanent rotor magnets 103 are attached to the plate 121, e.g., affixed or glued thereto, to provide the configuration shown in FIG. 5. The permanent rotor magnets 103 are preferably NDFeB type magnets that are very strong permanent magnets, although other types of magnets can be used. The assembly of two permanent rotor magnets 103 on the plate 121 is designed to create a maximum magnetic flex through the magnetic core 101, when the two permanent rotor magnets 103 are positioned next to the arms of the U-shaped magnetic core 101.

Figure 6:
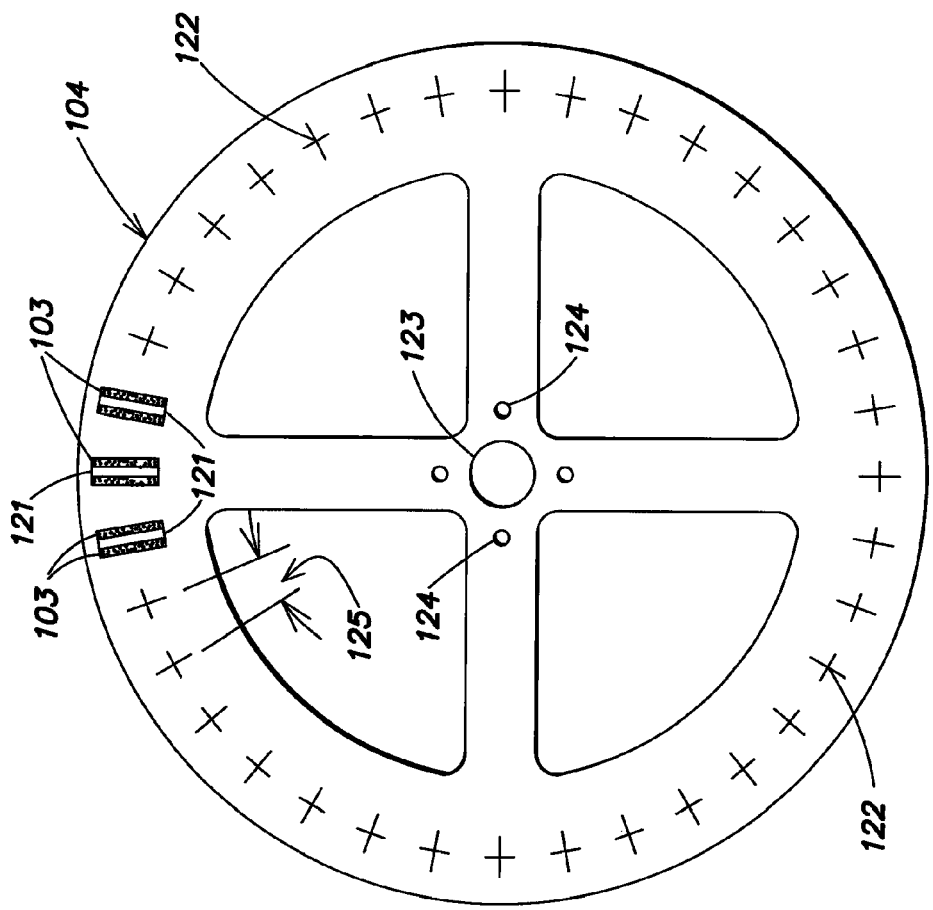
FIG. 6 is a front view of one of the rotor disks of the wind energy generating system in accordance with the invention.

FIG. 6 shows the rotor disk 104 with a plurality of magnetic assemblies connected to an annular portion thereof, with each assembly comprising a plate 121 and two permanent rotor magnets 103 affixed thereto. The material of the rotor disk 104 is preferably aluminum, fiber glass and/or carbon fiber, although other materials can be used. The plate 121 may be omitted in some embodiments so that the permanent rotor magnets 103 are attached directly to the rotor disk 104, e.g., glued thereto. Reference 122 designates the locations of the other magnetic assemblies that are not shown in FIG. 6. In the illustrated embodiment, an angle 125 between the centers of adjacent ones of the magnetic assemblies is about ten degrees. A center hole 123 of a central portion of the rotor disk 104 fits the outside diameter of a mating portion of a respective one of the bearing housings 110 and 114 (see FIG. 1). Holes 124 extending through the rotor disk 104 enable the rotor disk 104 to be connected to the bearing housings 110 and 114. Spoke portions connect the central portion with the center hole 123 to the annular portion to which the magnet assemblies are mounted. The wind energy generating system 10 in accordance with the present invention has at least two rotor disks 104, and the source of the magnetic flux of the rotor disks 104 is preferably permanent magnets but other type of magnets such as electromagnets can be used.

Figure 7:
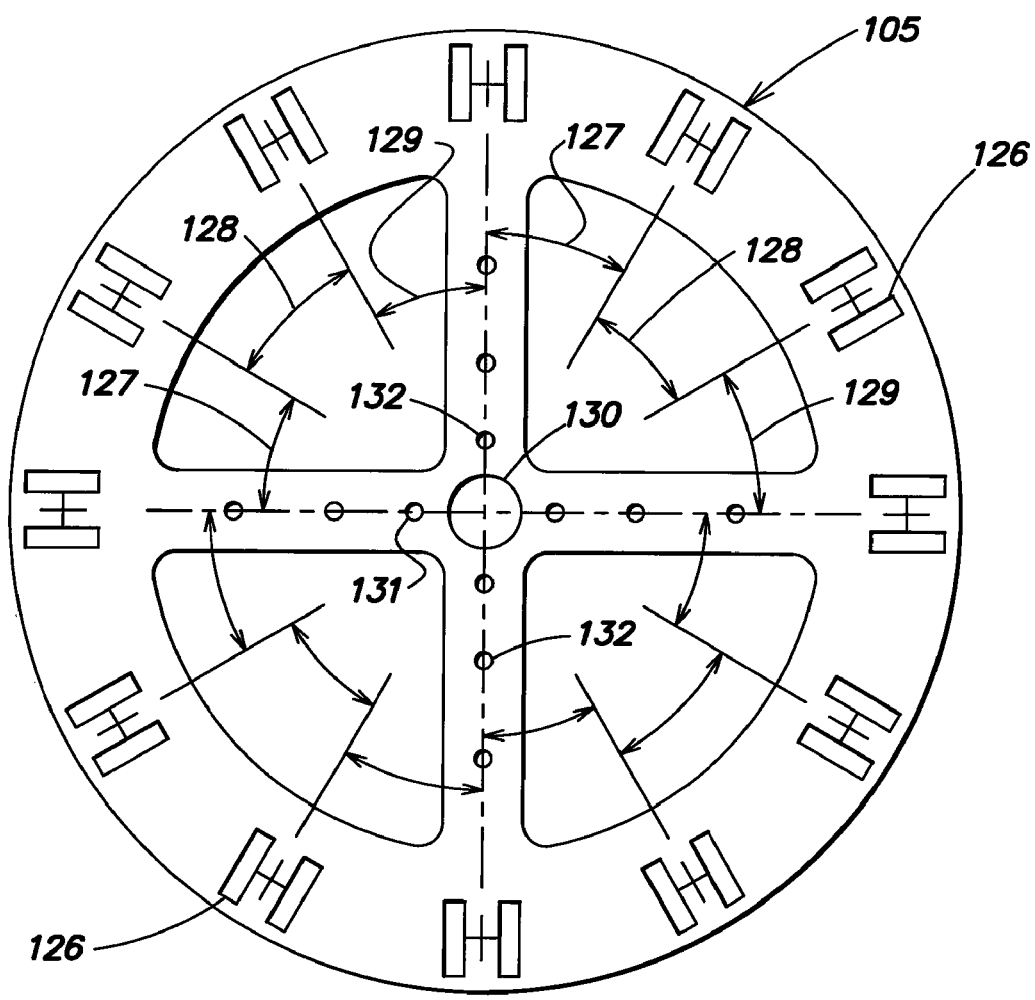
FIG. 7 is a front view of one of the stator disks of the wind energy generating system in accordance with the invention.

FIG. 7 shows a front view of the stator disk 105, which in this embodiment has a plurality of pairs of rectangular holes 126 in an annular portion. Magnetic cores 101 are attached to the stator disk 105 such that the arms of each magnetic core align with and possibly extend through a respective pair of holes 126 (see FIG. 4). Other methods for attaching the magnetic cores 101 to the stator disk 105 can be used in the invention and as noted above, other shapes and forms of magnetic cores can be used. The stator disk 105 itself can be formed as part of the magnetic cores. In one embodiment, coils without magnetic materials are attached to the stator disk 105.

A center hole 130 of a central portion of each stator disk 105 fits the outside diameter of supporting cylinder 112. Holes 131 extending through each stator disk 105 enable each stator disk 105 to be connected to the supporting cylinder 112. Holes 132 are used to connect the connecting elements 106 to the stator disks 105 so that via the connecting elements 106, the two stator disks 105 are connected to one another to allow torque to be transmitted from one stator disk 105 to the other.

Figure 13:
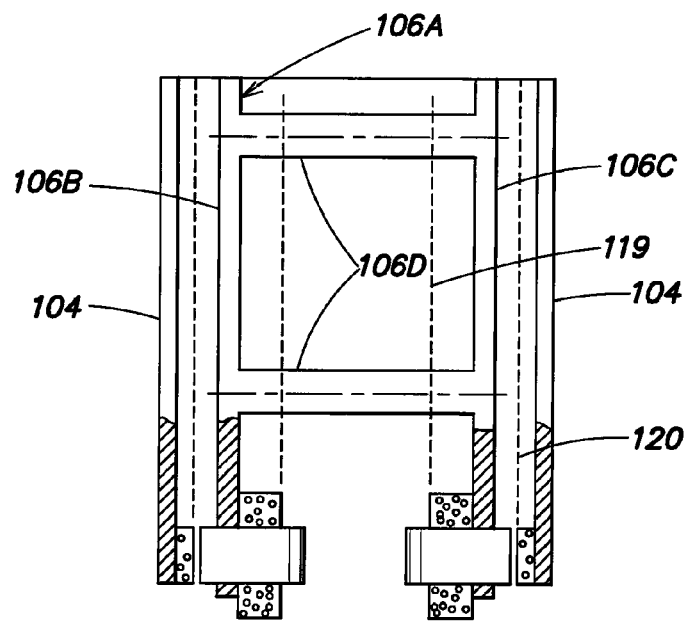
FIG. 13 is a partial view of the turbine section of the wind energy generating system showing another embodiment of a stator unit in accordance with the invention.
Figure 14:
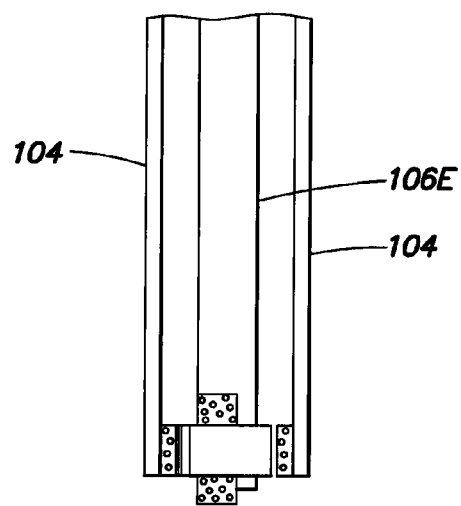
FIG. 14 is a partial view of the turbine section of the wind energy generating system showing yet another embodiment of a stator unit in accordance with the invention.

Instead of constructing the stator disks 105 as separate units, each mounted about the supporting cylinder 112, it is possible to construct the two stator disks 105 as one stator unit. For example, FIG. 13 shows the stator unit 106A as an integral unit with two disk-shaped portions on lateral sides wherein one disk-shaped portion 106B has a face oriented toward one rotor disk 104 and the other disk-shaped portion 106C has a face oriented toward the other rotor disk 104 and integral connecting struts 106D extend therebetween. Another envisioned construction of the stator unit is as a single disk-shaped member 106E as shown in FIG. 14, one side of which faces one rotor disk 104 and the other side of which faces the other rotor disk 104 so that connecting elements 106 are not necessary. However, in one or both of these embodiments, each section of the stator unit, which may be considered as a stator disk, should have sets of coils that are exposed to magnetic flex from a rotating rotor while at least two rotor disks are rotating in opposite directions. Thus, the stator unit defines two disk-shaped portions each facing a respective rotor disk 104, whether on the same integral member or separate members that are connected together.

The angles between the centers of the magnetic cores are designated 127, 128, and 129. In the illustrated embodiment, there are twelve sets of magnetic cores, so that when the angles 127, 128, 129 are equal, they all equal thirty degrees. If the angles are not equal, e.g., angle 127 is 33 degrees, angle 128 is 36 degrees and angle 129 is 21 degrees, low, no-load idle resistance of the system is obtained because all magnets and magnetic cores will not be at same maximum attraction angular position together. This angular differential arrangement will cause a differential in the phases of the output of the coils. The output electricity of the system can be multi-phase AC or each conductive coil assembly can be converted to DC and all of the DC outputs can be connected in a serial connection.

Figure 15:
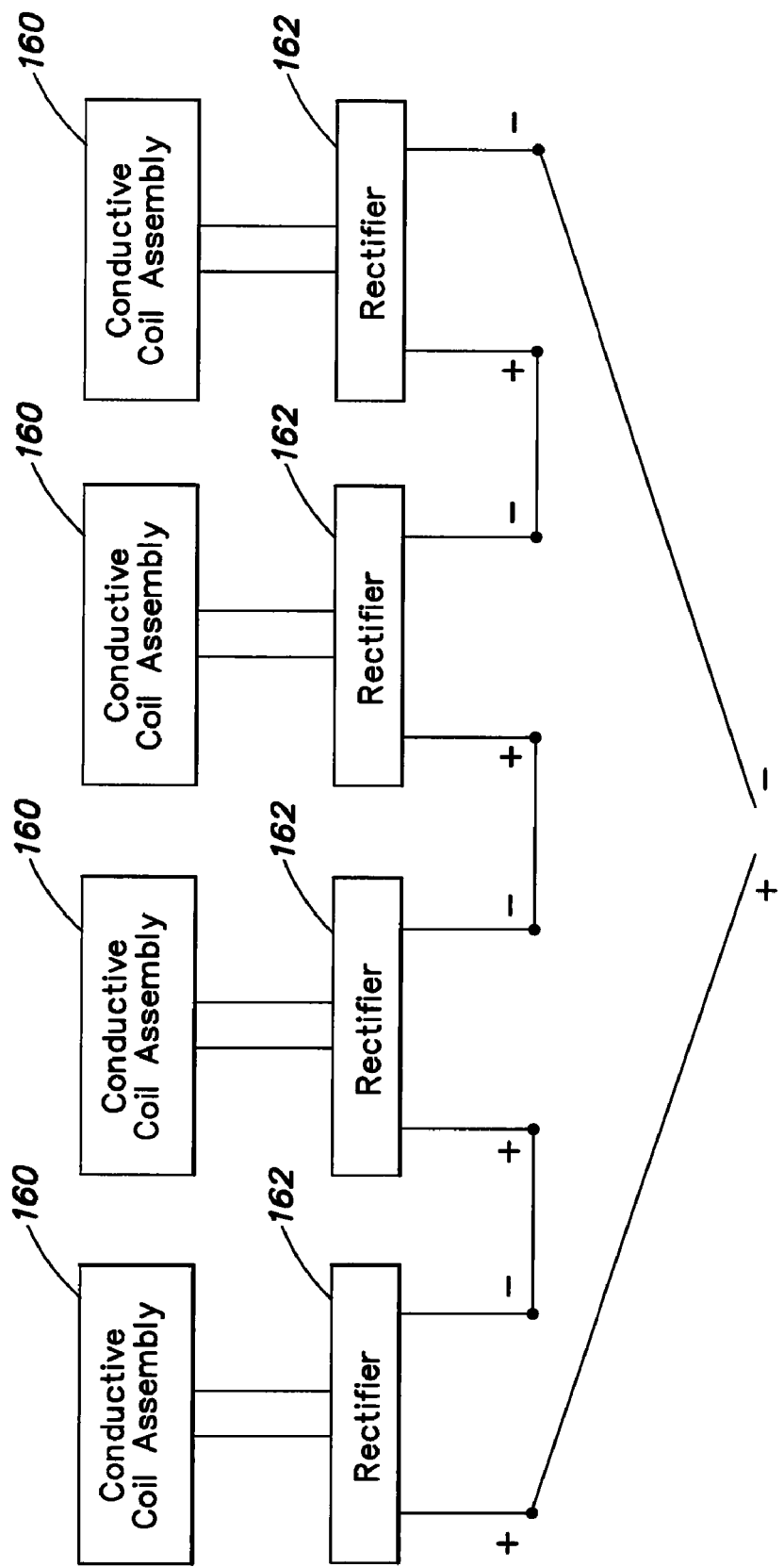
FIG. 15 is a schematic of one electricity processing system that delivers DC current from the wind energy generating system in accordance with the invention.

To this end, with reference to FIG. 15, a plurality of conductive coil assemblies 160 is shown and each is connected to a respective rectifier 162. Each rectifier 162 has a positive and negative output with the negative output of one rectifier 162 being connected to the positive output of another rectifier 162, in serial, with a single positive and negative output being provided from all of the rectifiers 162. This construction will result in a high DC voltage output.

The number of magnetic assemblies and the number of the magnetic cores can vary from those shown in the drawings so that any number of magnets and magnetic cores can be used in the invention.

Figure 12:
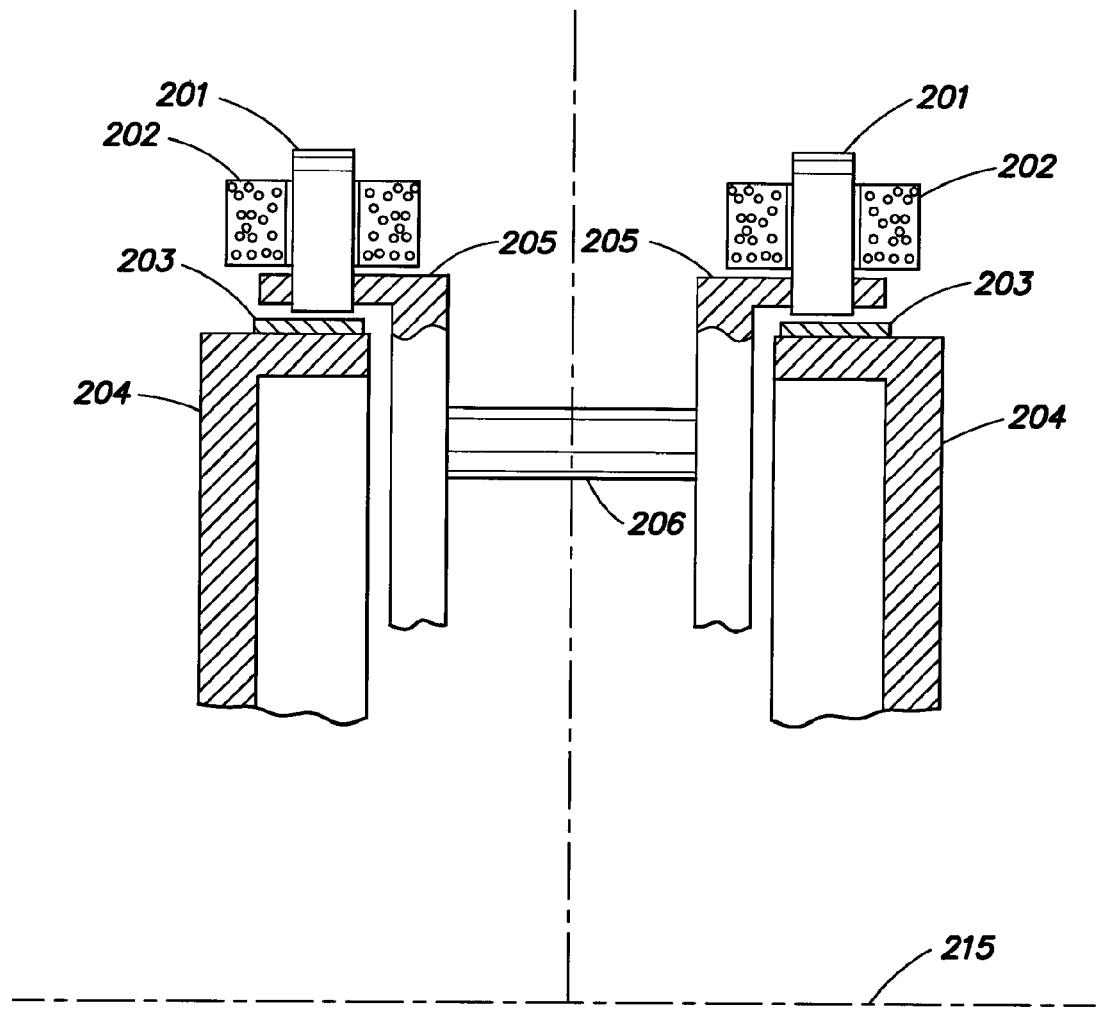
FIG. 12 is a side view, partially in cross-section, of a second embodiment of a wind energy generating system in accordance with the invention which is based on magnetic flux in a radial direction.

Referring now to FIG. 12, in the embodiments described above, the magnetic structure is arranged to generate magnetic flux is an axial direction. In the embodiment shown in FIG. 12, the magnetic structure is arranged to generate magnetic flux in the radial direction. Differences between this embodiment and the embodiments described above lie primary in the magnetic structure and otherwise, the same components of the wind energy generating system 10 may be used in this embodiment. This embodiment includes at least two rotor disks 204 rotatably mounted about a central shall represented by line 215, permanent rotor magnets 203 arranged on the rotor disks 204, two stator disks 205 fixedly mounted to the central shaft, connecting elements 206 that connect the stator disks 205 together, a plurality of magnetic cores 201 arranged on the stator disks 205, and pre-winding coils 202 arranged in connection with the magnetic cores 201. The connecting elements 206 function like connecting elements 106 to connect the stator disks 205 together to allow torque to be transmitted between the stator disks 205. The operations and torque-balancing in this embodiment are the same as explained above, with the main difference being that the direction of the magnetic flux is radial because the magnetic cores 201 are radially outward of the rotor magnets 203.

Figure 8:
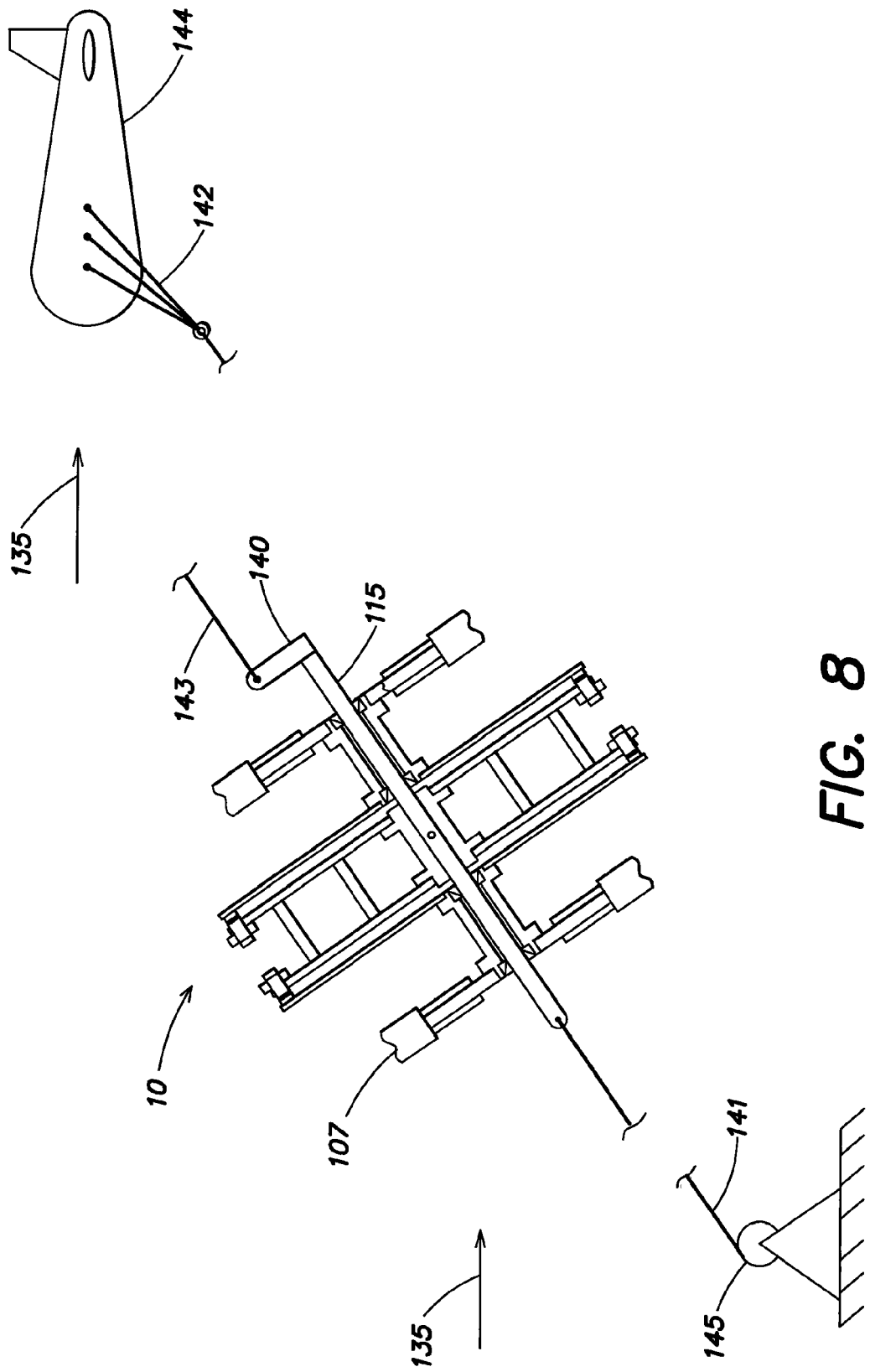
FIG. 8 is a side view of the wind energy generating system operating as an airborne version.

FIG. 8 shows the wind energy generating system 10 of the present invention operating as an airborne wind turbine. To this end, a lifting section 144 is coupled to the wind energy, and lifting section 144 may be a blimp containing a lighter-than-air gas such as helium. The lifting forces that act on the blimp are a floating force that the lighter-than-air helium creates, and the lift that is created by the aerodynamic shape of the blimp when acted upon by wind. The lifting forces of the blimp are transmitted through tethers 142 and 143 to the wind energy generating system 10 allowing the wind energy generating system to be airborne and operate at high altitude. Construction element 140 is interposed between and connects the main shaft 115 to the tether 143 and is arranged to cause the center of gravity of the airborne system to be lower than a virtual line connecting a point at which the tether 141 is connected to the wind energy generating system 10 and a point at which the tether 143 is connected to the wind energy generating system 10. As such, this position creates a pendulum effect that keeps the wind energy generating system 10 balanced with respect to torque. Tether 141 is connected to a winch 145 on the ground.

Figure 9:
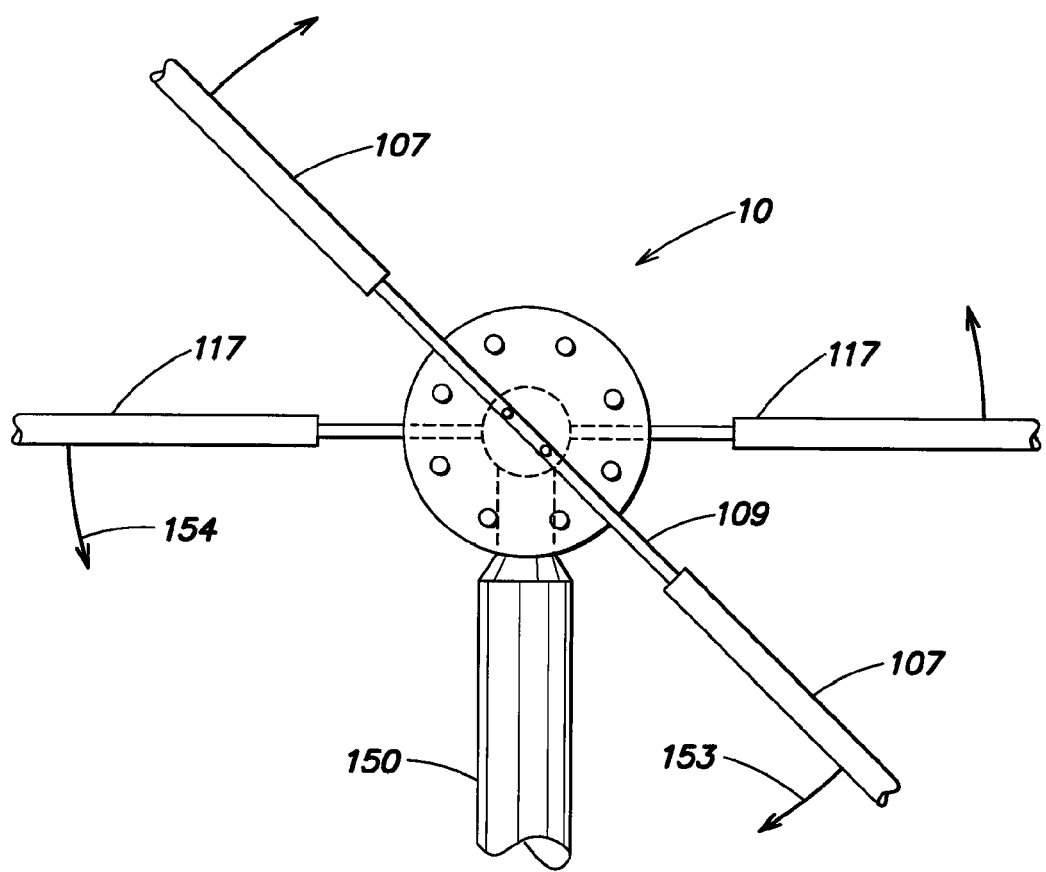
FIG. 9 is a front view of the wind energy generating system, operating as a ground-based version.
Figure 9:
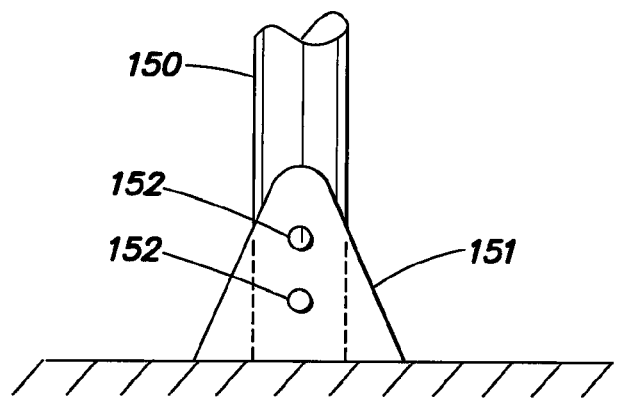
Figure 11:
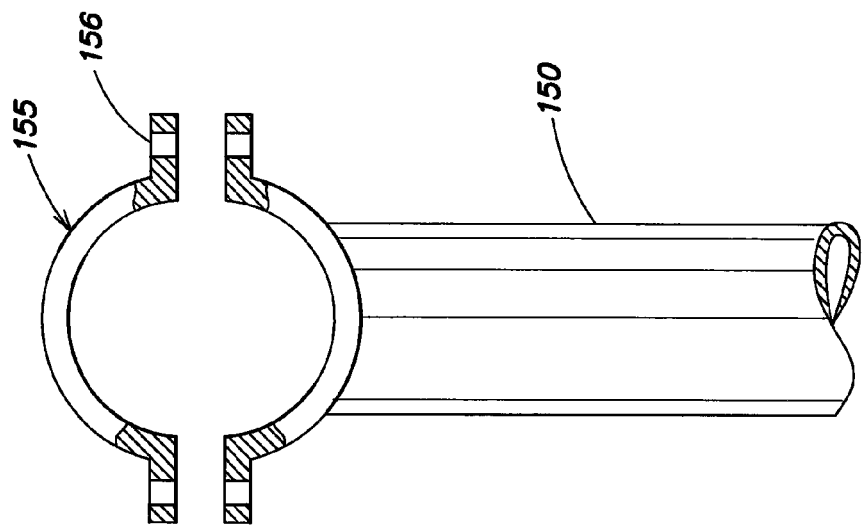
FIG. 11 is a side view of the connecting element of FIG. 10.
Figure 10:
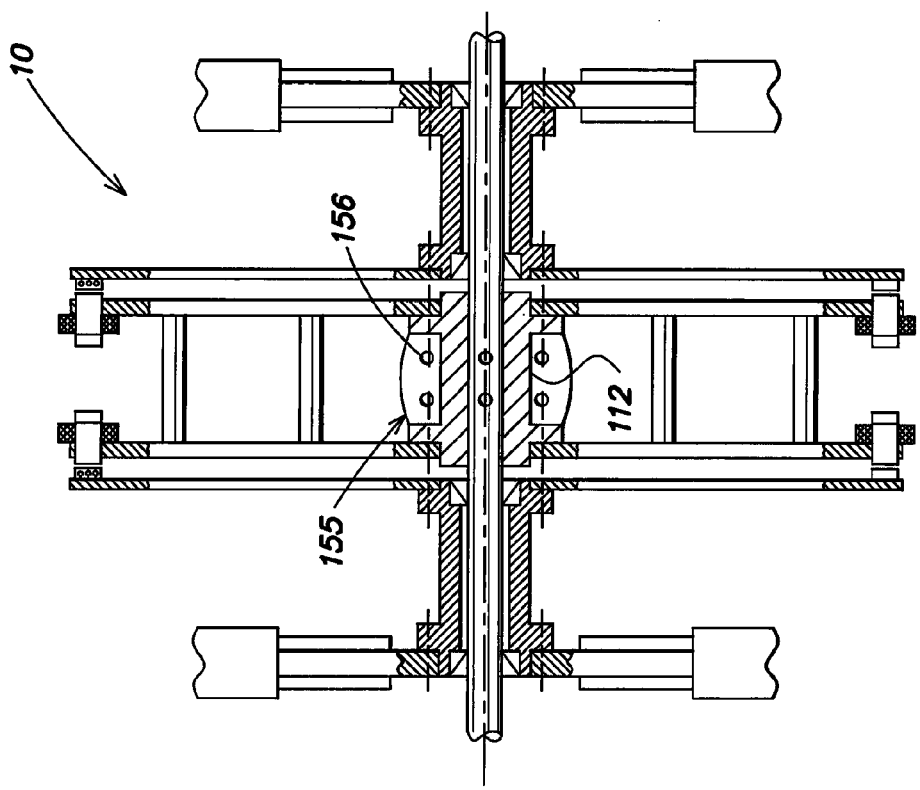
FIG. 10 is a cross-sectional view of the wind energy generating system shown in FIG. 9 with a connecting element that connects the wind energy generating system to a ground-based or offshore tower.

FIG. 9 shows the wind energy generating system 10 operating on the ground (or offshore) at an upper end of a vertical member 150 that may be any type of pole or tower that anchors the main shaft 115 to the ground or to the sea floor. This anchoring may be achieved using a base 151 and connecting screws 152, FIGS. 10 and 11 show exemplifying structure that may be used to support the main shaft in a fixed position relative to the ground or sea floor. The connecting structure includes a connecting element 155 that interacts with the supporting cylinder 112 that is fixedly mounted to the main shaft 115. The connecting element 155 has a lower portion defining a groove in which the supporting cylinder 112 rests and an upper portion that covers the supporting cylinder 112 and each of the lower and upper portions has flanges with holes 156 through which connecting members, such as screws, are placed to connect the lower and upper portions together with the supporting cylinder 112 and thus the main shaft 115 fixedly supported therebetween.

Figure 16:
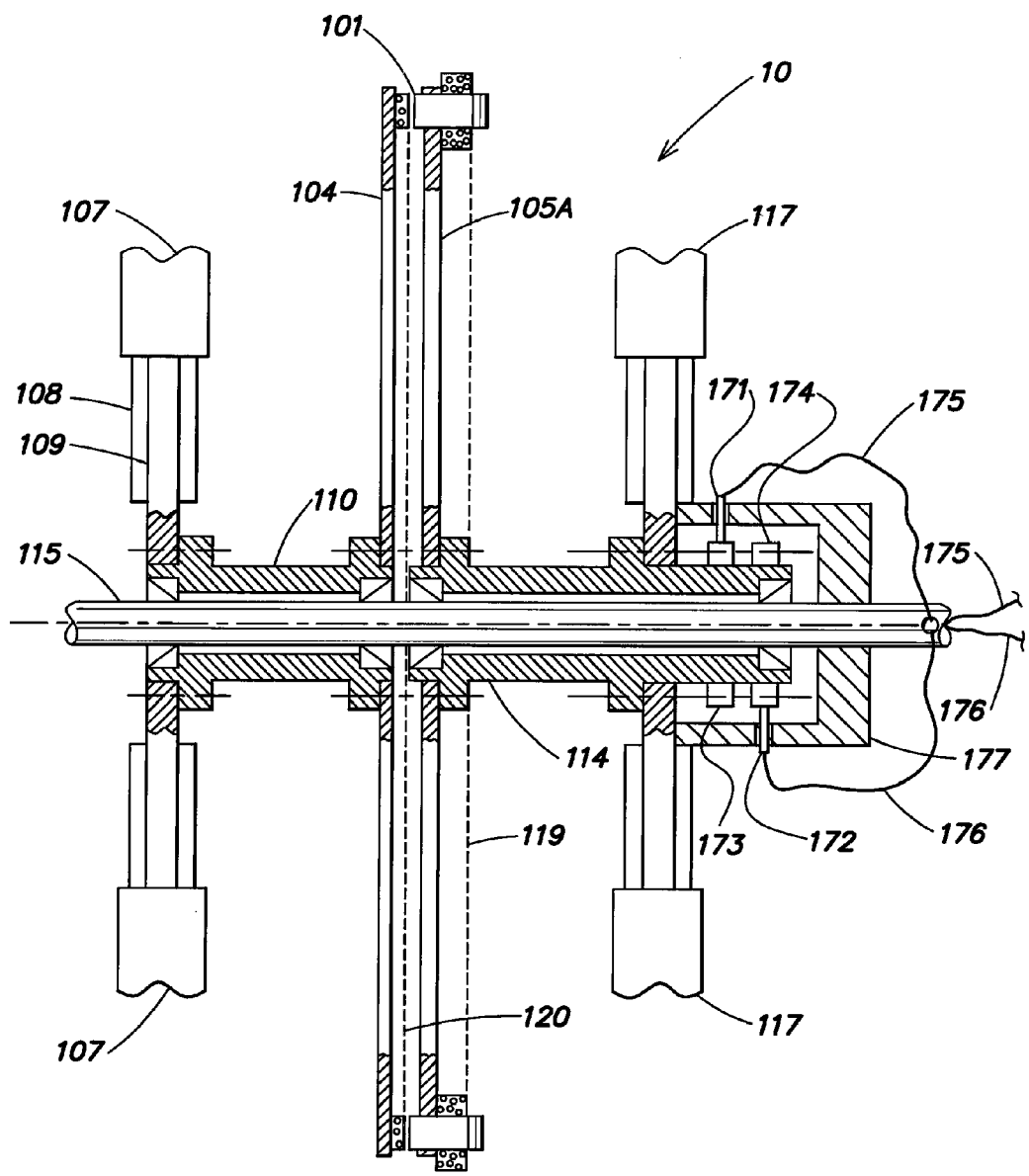
FIG. 16 is a side view, partially in cross-section, of another embodiment of the wind energy generating system in accordance with the invention.

Referring now to FIG. 16, in this embodiment of the invention, the rotor assembly has only a single rotor disk 104 and the remaining structure to provide for rotation of the rotor disk 105 upon rotation of the turbine including turbine blades 107 is the same as in the embodiment shown in FIG. 1. However, instead of another rotor disk 104 or other rotor member and a stator unit including a pair of stator disks 105, the embodiment shown in FIG. 16 includes a second rotating assembly that serves the same function as the stator disk 105 in the embodiment shown in FIG. 1. This second rotating assembly includes a single member such as a disk 105A that rotates relative to the rotor disk 104 and in an opposite direction thereto, e.g., while the front turbine including turbine blades 107 causes rotation of the rotor disk 104 in one direction when exposed to wind via the bearing housing 110, the rear turbine including turbine blades 117 causes rotation of the disk 105A in an opposite direction via the bearing housing 114 when exposed to the same wind. As in the embodiments described above, the rotor disk 104 includes magnets and associated structure and encompassing variations, and the rotating disk 105A includes conductive coil assemblies that were provided on the stator disk 105 in the embodiments above. The rotor disk 104 and rotating disk 105A are spaced apart such that the conductive coil assemblies and magnets are within a magnetic field of one another.

The electricity that is generated in the conductive coil assemblies on the disk 105A can be directed to pass through rectifiers described in connection with FIG. 15 and conducted to two conductive rings 173 and 174 arranged on the bearing housing 114. The DC electricity is then conducted through two conductive brushes 171 and 172 that are arranged in a non-conductive cylinder 177 fixed to the main shaft 115. The electricity passes through wires 175 and 176 connected to the brushes 171 and 172 for use and/or storage.

The combination of the single rotor disk 104 with magnets and single rotating disk 105A with conductive coil assemblies may be repeated on the same shaft 115.

Advantages of this embodiment of the invention include: by arranging the conductive coil assemblies on a rotating disk 105A (as opposed to on the non-rotational stator disk 105) and causing this rotating disk 105A to rotate in an opposite direction to the rotor disk 104 and such that the conductive coil assemblies are within a magnetic field range of the magnets on the rotor disk 104, the relative velocity between the magnets on the rotor disk 104 and the conductive coil assemblies on the rotating disk 105A is doubled. Since the power of the alternator is proportional to this relative velocity, a higher power from the same alternator can be achieved or a lower cost alternator can be built while achieving the same power (in comparison to a case wherein the alternator is associated with a construction wherein a stator disk with the conductive coil assemblies is non-rotational relative to the rotor disk). Another advantage is that lighter alternators can be built according to this embodiment, which is important for airborne wind turbines, as well as for ground-based and offshore wind turbines. Yet another advantage is that the opposite directional torques are being transferred from the rotor to the rotating disk and from the rotating disk to the rotor electrically, without need of special construction elements.

It is to be understood that the present invention is not limited to the embodiments described above, but includes any and all embodiments within the scope of the following claims. While the invention has been described above with respect to specific apparatus and specific implementations, it should be clear that various modifications and alterations can be made, and various features of one embodiment can be included in other embodiments, within the scope of the present invention.

The invention claimed is:

1. A wind energy generating system, comprising:
a supporting structure;
at least two turbines arranged on said supporting structure to rotate in opposite directions when exposed to the same wind;
at least two rotor disks, each rotatably connected to one of said turbines such that said at least two rotor disks rotate in opposite directions when said at least two turbines are exposed to the same wind; and
a stator unit including first and second sides, each facing a respective one of said rotor disks, said stator unit being arranged such that torque generated by rotation of each of said turbines can be transmitted through said stator unit with a view toward balancing the torque induced on said supporting structure by rotation of said turbines.

2. The system of claim 1, wherein said supporting structure comprises a main shaft that defines a rotation axis about which said turbines rotate, further comprising:
bearing housings rotatably mounted on said shaft; and
hubs for connecting said turbines to said bearing housing.

3. The system of claim 1, further comprising:
magnets arranged on said rotor disks; and
a plurality of conductive coil assemblies arranged on said stator unit;
each of said rotor disks being arranged relative to said first or second side of said stator unit such that said magnets on said rotor disks generate a magnetic field that encompasses said plurality of conductive coil assemblies on said first or second side of said stator unit.

4. The system of claim 3, wherein each of said conductive coil assemblies comprises a magnetic core and at least one coil wound on said magnetic core.

5. The system of claim 3, wherein each of said conductive coil assemblies comprises a generally U-shaped magnetic core and a pair of coils each wound on a respective arm of said U-shaped magnetic core.

6. The system of claim 5, wherein said magnets on said rotor disks are arranged in pairs, further comprising a plurality of plates, each of said plates being connected to a respective pair of said magnets and being fixed to one of said rotor disks.

7. The system of claim 3, wherein said magnets are permanent magnets.

8. The system of claim 3, wherein said rotor disks and said stator unit are arranged relative to one another such that said magnets on said rotor disks and said conductive coil assemblies on said stator unit are spaced apart from one another in an axial direction of said supporting structure.

9. The system of claim 3, wherein said rotor disks and said stator unit are arranged relative to one another such that said magnets on said rotor disks and said conductive coil assemblies on said stator unit are spaced apart from one another in a radial direction of said supporting structure.

10. The system of claim 3, further comprising a plurality of rectifiers, each associated with a respective one of said conductive coil assemblies, said rectifiers being arranged in serial to obtain a single DC voltage output.

11. The system of claim 3, wherein said conductive coil assemblies are distributed around a periphery of said first and second sides of said stator unit at a predetermined angular spacing such that all of said conductive coil assemblies on at least one side of said stator unit are not directly opposite a respective one of said magnets on a facing one of said rotor disks in a maximum attraction state to thereby obtain low idle resistance between said rotor disks and said stator unit.

12. The system of claim 1, wherein said stator unit comprises two separate stator disks each defining one of said sides of said stator unit, said sides being disk-shaped, said stator disks being rigidly connected together.

13. The system of claim 12, wherein each of said stator disks includes an annular portion, further comprising a plurality of conductive coil assemblies circumferentially spaced from one another around said annular portions of said stator disks.

14. The system of claim 12, further comprising connecting elements arranged between said stator disks to connect said stator disks together and transfer opposite directional torques between said stator disks and enable the torque-balancing.

15. The system of claim 1, wherein said stator unit is an integral structure that includes a first disk-shaped portion defining said first side and a second disk-shaped portion defining said second side, and integral connecting elements connecting said first and second disk-shaped portions together.

16. The system of claim 1, wherein said stator unit consists of a single disk-shaped member having opposed outer later surfaces that define said first and second sides of said stator unit.

17. The system of claim 1, wherein said supporting structure comprises a main shaft that defines a rotation axis about which said turbines rotate, further comprising a supporting cylinder that connects said stator unit to said main shaft.

18. The system of claim 1, wherein each of said rotor disks includes an annular portion, further comprising magnets circumferentially spaced from one another around said annular portion of said rotor disks.

19. The system of claim 1, further comprising a lifting section coupled to said supporting structure for enabling said supporting structure to have an airborne state.

20. The system of claim 1, wherein said supporting structure comprises a main shaft that defines a rotation axis about which said turbines rotate and a vertical member arranged to elevate said main shaft from a ground surface or floor of a body of water, further comprising:
 a supporting cylinder that connects said stator unit to said main shaft; and
 a connecting element that interacts with said supporting cylinder and said vertical member to securely support said supporting cylinder and thus said main shaft on said vertical member.

21. A wind energy generating system, comprising:
 a supporting structure;
 at least two turbines arranged on said supporting structure to rotate in opposite direction when exposed to the same wind;
 at least one first rotating assembly rotatably connected to a first one of said turbines, each of said at least one first rotating assembly comprising magnets; and
 at least one second rotating assembly rotatably connected to a second one of said turbines such that said at least one second rotating assembly rotates in an opposite direction to said at least one first rotating assembly when said at least two turbines are exposed to the same wind, each of said at least one second rotating assembly comprising conductive coil assemblies;
 said first and second rotating assemblies being arranged relative to one another such that a relative velocity between said magnets on said at least one first rotating assembly and said conductive coil assemblies on said at least one second rotating assembly is approximately a sum of a rotational velocity of said first and second rotating assemblies,
 whereby said first and second rotating assemblies induce approximately the same torque in opposite direction on each other with a view toward balancing torques induced on said supporting structure by rotation of said turbines.

22. The system of claim 21, further comprising a plurality of rectifiers, each associated with a respective one of said conductive coil assemblies, said rectifiers being arranged in serial to obtain a single DC voltage output from AC electricity outputs of said conductive coil assemblies.

\* \* \* \* \*